Patented Nov. 15, 1938

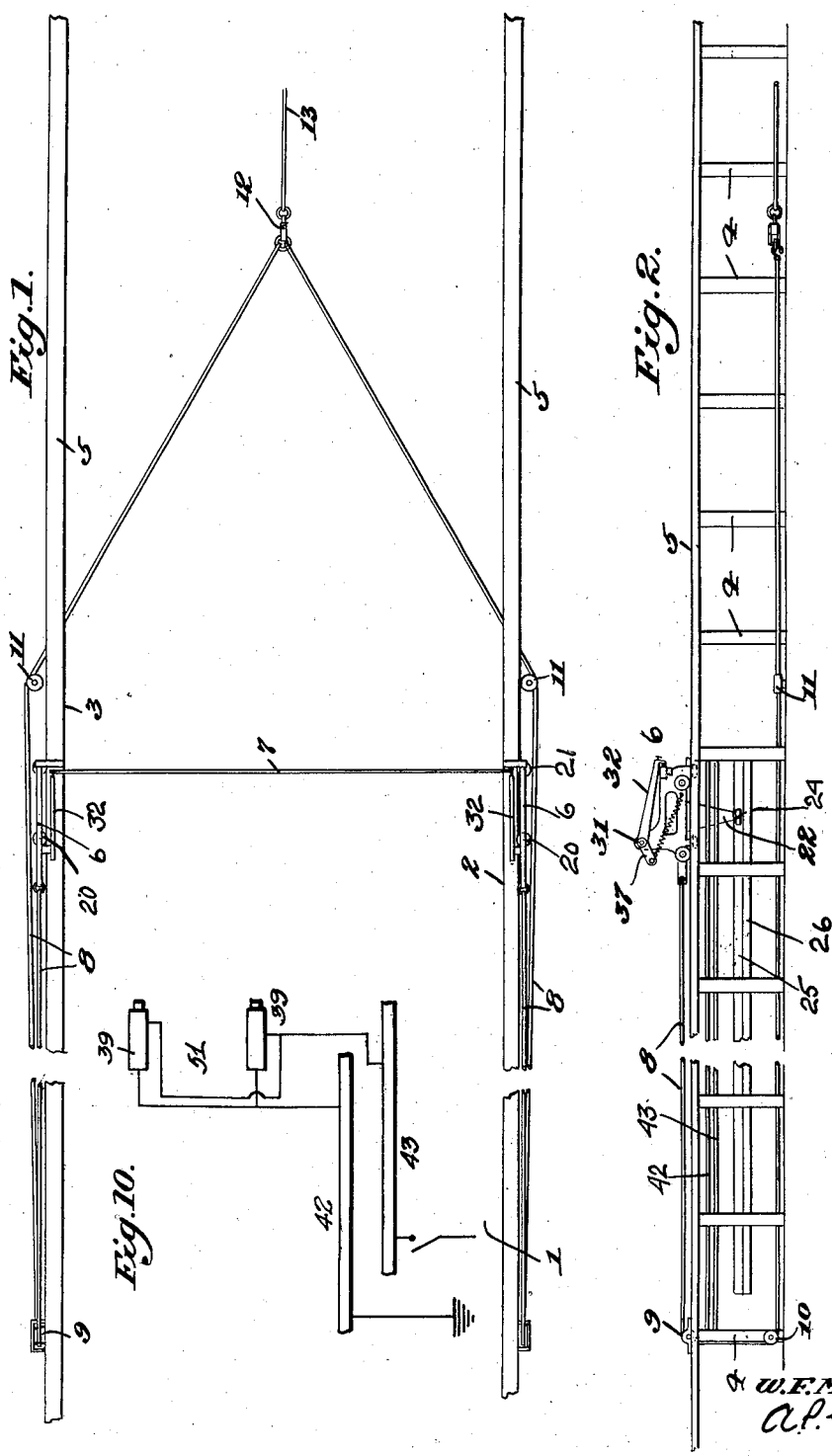

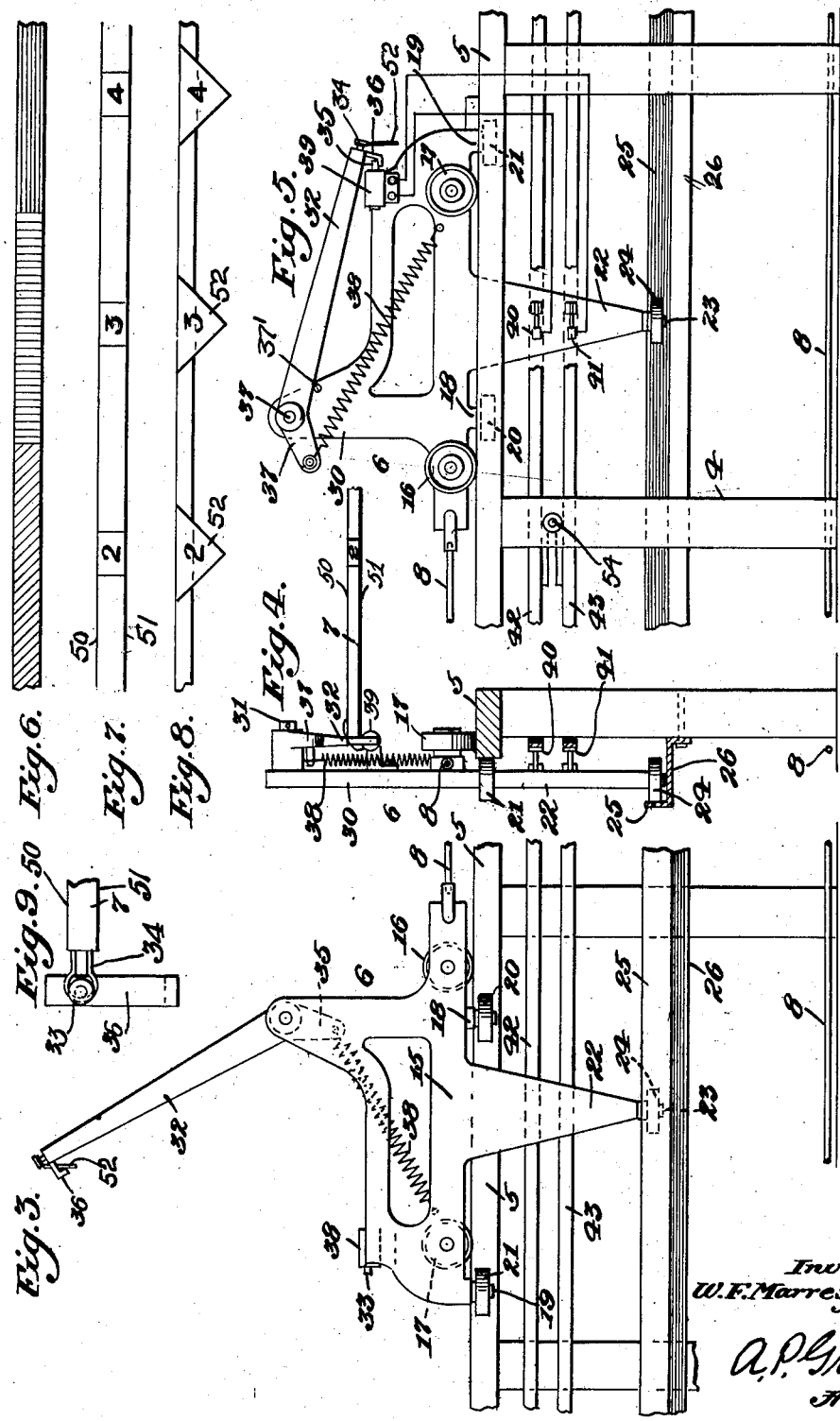

2,136,365

UNITED STATES PATENT OFFICE 2,136,365

APPARATUS FOR STARTING RACE HORSES

William F. Marresford, Niagara Falls, N. Y.

Application April 13, 1934, Serial No. 720,471

12 Claims. (Cl. 119—15.5)

My invention relates to apparatus for starting race horses and other racing animals, in which the horses or other animals are to be brought into such alignment across the race course as to ensure a fair start for each. Devices having this purpose in view are well known and some of these devices are in more or less extensive use.

Among the objects of my invention are to provide a simple relatively inexpensive starting apparatus which can be readily moved, from one point to another on the race course; to provide an apparatus in which a barrier extending across the race course in front of the horses may be raised out of their way; to provide an apparatus in which the barrier may be caused to travel in front of the horses and raised out of their way as they are brought into alignment; to provide simple and readily detachable means for causing the forward travel of the barrier; to provide an arrangement by which the starter may cause the barrier to be raised at any point in its forward travel; to provide barrier carrying means which may be readily lifted from its rails and moved by an individual operator; to provide barrier carrying means which will be held against removal from supporting rails by the barrier; to provide a barrier by which the preferred paths of movement for each horse will be indicated; and to provide starting apparatus in which all parts of substantial weight will be outside the race course, and will not obstruct the view of spectators or be liable to fall on the race course.

With the above objects and other objects hereinafter explained in view, my invention consists in and comprises the construction and combination of elements hereinafter described and claimed.

Referring to the drawings:

Figure 1 is a horizontal plan view of a portion of a race course having starting apparatus embodying my invention in position.

Figure 2 is a view taken from midway between the rails looking to the left of the Figure 1.

Figure 3 is a side view of a carriage for the barrier taken from outside the rail showing the barrier carrying arm in elevated position.

Figure 4 is an end view of the carriage looking forward.

Figure 5 is a side view of the carriage taken from between the rails showing the barrier carrying arm in depressed or down position.

Figures 6, 7, and 8 show a variety of different forms of barrier.

Figure 9 is a detail view of the connections of the barrier with its supporting arm.

Figure 10 is a diagrammatic view of the wiring.

In the drawings I indicates a portion of a race course of usual construction provided on its opposite sides with fences 2 and 3 respectively, each comprising posts 4 and a top rail 5 which is adapted to support and guide a carriage 6, the carriages on the rails 5 of the opposite fences being arranged directly opposite one to the other so as to carry between them a barrier 7 which extends across the race course and is so arranged that it will be directly in front of the race horses, as they are being brought into alignment for starting, and, at the instant of starting, will be raised out of the way of the horses.

To the front end of the carriage 6 on each side of the track is secured a flexible connection 8 which may be a cord or tape, which extends over pulley 9 in the forward portion of the rail 5 and then downward about pulley 10 on the lower portion of a post 4 and then rearward to guide pulley 11 from which it extends inward to about the middle of the race course where the connections from the carriages are brought together at 12 so that rearward drag as by cord 13 will cause simultaneous and equal forward movement of the carriages 6 on each of the two side rails.

By thus causing the carriages to move forward the barrier 7 may be moved forward so as to permit the race horses to walk forward into line thus lessening the disturbance due to nervousness where an attempt is made to get them to stand still in line and facilitating bringing them into line quickly.

Each of the carriages 6 comprises a plate having horizontal portion 15 having near its ends wheels 16 and 17 carried on horizontal stub axles arranged to bear on the top face of rail 5 and also having downwardly extending stub axles 18 and 19 carrying respectively guide wheels 20 and 21 arranged to bear against the outer side rail 5. From horizontal portion 15 an arm 22 extends downward having at its end a vertical stub axle 23 on which is carried wheel 24 which is arranged to bear against the inner face of a ledge 25 on the outer edge of plate 26 which is secured to posts 4 and is co-extensive with rails 5. The stub axles of wheels 16 and 17 are of such length that the carriages will stay in place while at rest even when the barrier 7 is not connected to them but when the barrier is disconnected a carriage may be taken off the rails by lifting it sufficiently to disengage wheel 24 from ledge 25 when the entire carriage may be carried away by a single individual of ordinary strength.

From the forward end of horizontal portion 15 an arm 30 extends upward carrying near its upper end a pivot 31 for a rearwardly extending arm 32 which is provided at its free end with hook 33 adapted to receive ring 34 on the end of web 7, the arrangement being such that when arm 32 is in the position in which it is shown in Figure 5 the barrier will extend across the race course in front of the horses so that they cannot pass. Arm 32 is locked in this position by a pin 35 engaging a hook 36 on the arm.

The barrier 7 is of such length that when in place with its ends secured to the ends of arms 32 it will hold guide wheels 20 and 21 against the outer edge of rail 5 and will hold wheel 24 against the inner face of rim 25 of plate 26.

An arm 37 formed integral with or secured to arm 32 extends forward from pivot 31 and to the end of this arm 37 is secured one end of coiled spring 38, the other end of which is secured to horizontal portion 15 near its rear end. On the withdrawal of pin 35 from engagement with hook 36 spring 38 will by its pull on arm 37 cause arm 32 to swing upward to the position in which it is shown in Figure 3 until it comes against stop pin 37¹, thus raising barrier 7 high enough to permit the horses and their riders to pass beneath it. Pin 35 is formed on the end of the core of a solenoid 39, the coil of which has its terminal in circuit respectively with one or the other of contact shoes 40 and 41 which have rubbing contact respectively with conductors 42 and 43 which are strips of copper or the like carried on the outer faces of posts 4, in circuit respectively with opposite poles of a source of current. A circuit closing switch 54 located at any convenient point preferably in reach of the starter serves to close circuit through the solenoid 39. The conductors 42, 43, may be arranged on the posts of the fences on both sides of the race course but will usually be arranged on one side of the race course only. As it is essential that both ends of the barrier be raised at the same time the coils of solenoids 39 of both carriages must be in the same circuit so that they will both be engaged at the same time. This connection between the two solenoids may be effected by underground or overhead wires, but is preferably effected by a wire 51 carried by the barrier 7.

In Figures 6, 7, and 8 are shown three varieties of the barrier. In Figure 6 the paths for different horses are indicated by different colors, the colors indicated being green, red, and blue. In Figure 7, ordinals 2, 3, 4, etc., are applied direct to the wires 50 and 51 forming the barrier and in Figure 8 the ordinals are shown applied to tabs 52 depending from a strip of webbing.

The distance to be traveled by the carriages 6 and the speed of movement of the barrier are regulated by the movement given to flexible connections 8 which may be drawn rearward by any convenient power applied to cord 13. By detaching the ends of the flexible connections from cord 13 the ends of the connections may be swung to one side so as to leave the race course unobstructed. By detaching the ends of the barrier from arm 32 the barrier and the carriages 6 may be removed to be stored away or to be placed on some other portion of the race course. Thus the apparatus may be readily shifted to points at which different races are to be started and at which the width of the track often varies, it being necessary only to provide at the different starting points rails 5 and 26 and ledges 25 and conductors 42 and 43, of suitable length.

It will be noted that in the apparatus shown the barrier is the only element which extends over the race course and as this barrier is formed of material relatively light in weight and as the carriages are so mounted on their rails that they cannot fall inward onto the race course, all danger of injury to the horses or their riders from the falling onto the race course of anything which would obstruct free travel is avoided. As the carriages need to extend upward above the track only far enough to support the pivot of the barrier carrying arm, they present nothing to obstruct the view of the horses by spectators.

It will, of course, be understod that the apparatus described may be used for starting any racing animals whether horses, dogs or other animals.

Having thus described my invention, what I claim is:—

1. In apparatus for starting race horses, rails one on each side of the race course, a carriage on each rail movable thereon having a rearwardly extending arm pivoted thereon, a barrier extending across the race course having its ends secured to the arms carried by the respective carriages, and means for causing said arms to swing in an upward direction to raise the barrier out of the path of movement of the horses.

2. In apparatus for starting race horses, rails one on each side of the race course, a carriage on each rail movable thereon, each having an arm so pivoted thereon as to extend rearwardly therefrom in an approximately horizontal plane when the barrier is in lowered position and to swing in a vertical plane, a barrier extending across the race course having its ends secured to the pivoted arms, a spring for each arm acting to swing it upward, means for locking the arms in down position, and means for releasing the locking means of both arms simultaneously.

3. In apparatus for starting race horses, rails one on each side of the race course, each having an upper face adapted to support a wheel and an outer side adapted to serve as a guide for a wheel, supporting means for the rails, and carriages each having wheels arranged to travel on the upper face of the rail and wheels arranged to bear against the outer side of the rail, means for holding said wheels against the outer side of the rail comprising means carried by the carriages for supporting a barrier, and a barrier extending across the race course secured at its ends to said barrier supporting means, a downwardly extending arm on each carriage and means for preventing its outward swing.

4. In apparatus for starting race horses, rails one on each side of the race course, each having an upper face adapted to support a wheel and an outer side adapted to serve as a guide for a wheel, supporting means for the rails, and carriages each having wheels arranged to travel on the upper face of the rail and wheels arranged to bear against the outer side of the rail, means for holding said wheels against the outer side of the rail comprising means carried by the carriage for supporting a barrier, and a barrier extending across the race course secured at its ends to said barrier supporting means, a downwardly extending arm on each carriage and means carried by the rail supports for preventing its outward swing adapted to permit its inward movement.

5. In apparatus for starting race horses, rails one on each side of the race course, each having an upper face adapted to support a wheel and an outer side adapted to serve as a guide for a wheel, supporting means for the rails, and carriages each having wheels arranged to travel on the upper face of the rail and wheels arranged to bear against the outer side of the rail, means for holding said wheels against the outer side of the rail comprising means carried by the carriage for supporting a barrier, a downwardly extending arm on each carriage and means carried by the rail supports for preventing its outward swing comprising a plate having an upwardly extending ledge at its outer edge, said barrier being secured at its end to the carriages at a level above the rails.

6. In apparatus for starting race horses, a barrier extending across the race course in the path of the race horses, consisting of parallel elements joined at intervals by indicators for the purpose of securing the desired transverse spacing of the race horses, one of the elements being an electrical conductor, and means for removing the barrier from the path of the horses.

7. In apparatus for starting race horses, rails one on each side of the race course, a movable carriage on each rail, means for retaining the carriages in upright position, a barrier supporting arm pivotally mounted on each of said carriages, a barrier extending across the race course having its ends secured to the free ends of said arms carried by the respective carriages, said arms being so pivoted at the other ends to the respective carriages as to extend therefrom in an approximately horizontal plane when the barrier is in lowered position, and means for causing said arms to swing in an upward and forward direction to raise the barrier out of the path of movement of the horses.

8. In an apparatus for starting race horses, rails one on each side of the race course, a movable carriage on each rail, means for retaining the carriages in an upright position on their rails, each carriage carrying a rearwardly extending arm so pivoted on its carriage as to extend therefrom in an approximately horizontal plane when the barrier is in lowered position, a barrier extending across the race course having its ends connected to the arms pivoted to the respective carriages, means for operating the arms to raise the barrier out of the path of movement of the horses and means for moving the carriages on their rails simultaneously in the same direction.

9. In apparatus for starting race horses, rails one on each side of the race course, a carriage on each rail movable thereon, a barrier supporting arm pivotally mounted on each of said carriages and extending rearwardly therefrom, a barrier extending across the race course having its ends secured to the free ends of said arms carried by the respective carriages, said arms being so pivoted at their forward ends to the respective carriages as to extend therefrom in an approximately horizontal plane when the barrier is in lowered position, means for causing said arms to swing to an upward position to raise the barrier out of the path of the horses and means for moving the carriages on their rails simultaneously in the same direction.

10. In apparatus for starting race horses, carriages on opposite sides of a race course adapted to carry a barrier, means connected with the carriages for connecting them with propelling means consisting of cords passing first forwardly from the carriages the requisite distance and thence rearwardly to a point in the rear of the carriages at substantially the course level, and adapted to lie on the surface of the course to a point midway between the side of the track to be secured by a readily detachable connection to propelling means.

11. In apparatus for starting race horses, a barrier extending across the race course, carriages one on each side of the race course carrying the ends of the barrier and means for moving the carriages in the direction of forward movement of the horses comprising pulleys arranged one forward of each carriage and cords which rest loosely on the surface of the track leading forward from each carriage one about each pulley and thence to a point in rear of the carriage, the cords converging from the sides of the track toward the middle of the track to be detachably secured to a propelling means so that after the race is started the converging portion of the cords may readily be removed from the path of the horses.

12. A barrier for a race track comprising parallel elements, means at spaced intervals along said elements for securing the same and providing locators corresponding to the desired positioning of race horses at the start of a race, one of said elements being an electrical conductor and means associated with said electrical conductor for energizing the same and adapted to cause movement of the elements from the path of the horses.

WILLIAM F. MARRESFORD.